Nov. 28, 1933.   R. HORCH   1,937,226
APPARATUS FOR MAINTAINING THE TEMPERATURE OF A FERMENTING LIQUID
Filed Feb. 11, 1931
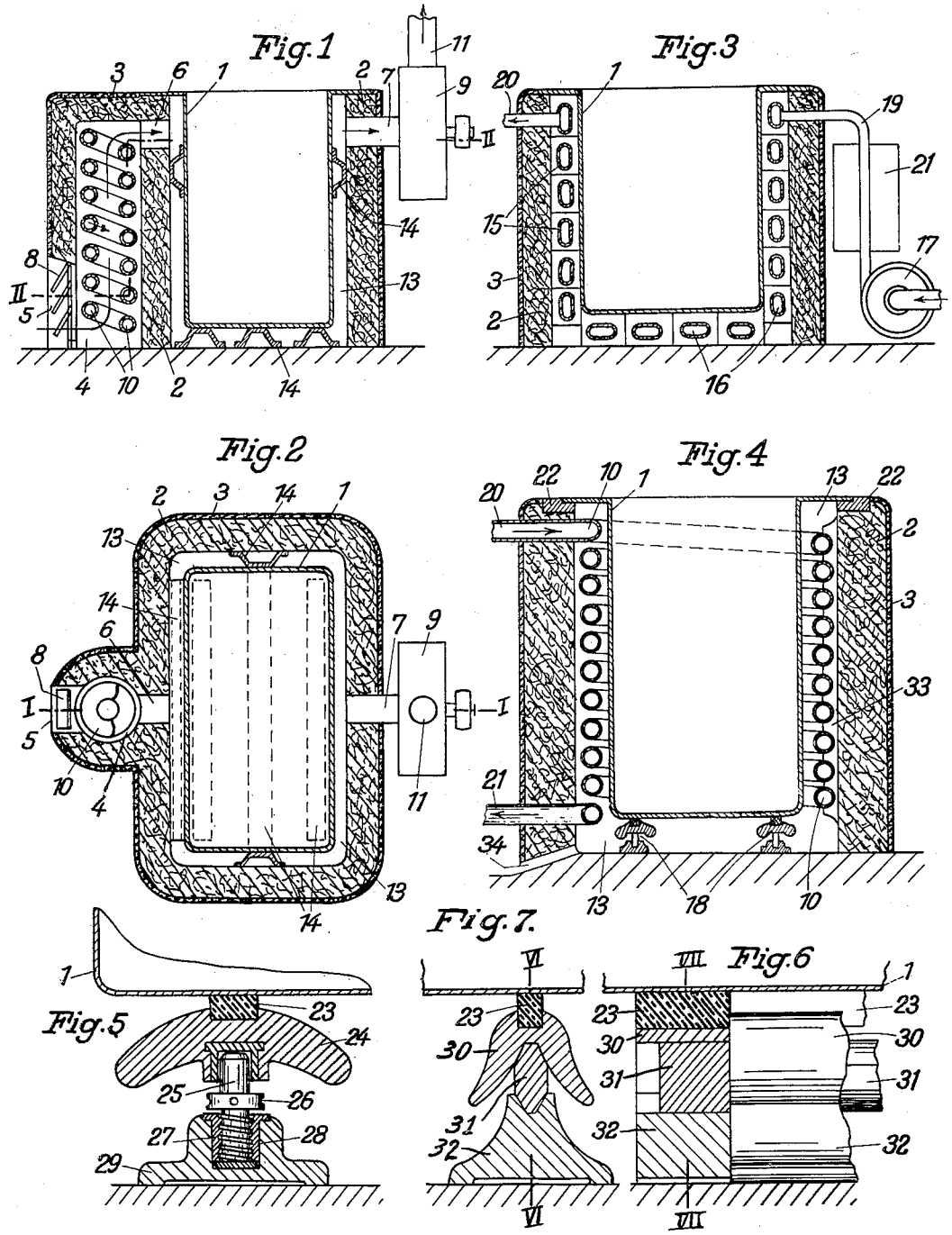
Inventor:
Rudolf Horch
by: A. E. Odell
Attorney.

Patented Nov. 28, 1933

1,937,226

UNITED STATES PATENT OFFICE 1,937,226

APPARATUS FOR MAINTAINING THE TEMPERATURE OF A FERMENTING LIQUID

Rudolf Horch, Radeberg in Saxony, Germany

Application February 11, 1931, Serial No. 515,099, and in Germany February 20, 1930

5 Claims. (Cl. 257—208)

It is known that in fermentation processes particularly in breweries, but also in distilleries, yeast factories and the like, cessations of fermentation often occur which lead to considerable interruptions in production and to material losses.

Cases occur in which the fermentation, both the main fermentation and the after fermentation, ceases too soon and cannot in any way be set in action again, in spite of the liquid to be fermented containing adequate quantities of sugar. Fiery fermentation and similar inconvenient fermentation phenomena are also to be observed.

It has become known that in the fermentation process hitherto carried out, the unsuitable removal of the heat of fermentation by relatively small strongly cooled cooling surfaces plays a particularly disadvantageous part. The temperature differences at the cooling surfaces of the cooling systems hitherto used, for example cooling coils, ice floats and the like set in the fermentation vats, or cooling coils or the like wound round the outside of the fermentation vessels and embedded in their walls, which are served only by a refrigerant at a very low temperature so that there is a relatively great temperature drop between the liquid to be fermented and the refrigerant, effect a quenching of the fermentation and have an undesirable effect on the fermentation exciter.

It is in itself conceivable to effect the cooling solely by the room or cellar air kept correspondingly cool, and to carry off the heat solely through the walls of the fermentation vessel into such air. This air cooling process through the walls of the vat, which would be of advantage as regards the quality of the fermented beverage or the like owing to the uniformity and continuity of the tempering process, could not be carried into practice hitherto because any single fermenting or storing room always contains filled fermentation vessels in the most varied stages of fermentation which as is known need to be tempered quite differently. Therefore since the temperature of the room air is the same for all fermenting or storing vessels irrespective of the condition of their contents, the use of the above described liquid coolers has been unavoidable.

To avoid the use of liquid coolers while controlling the temperature of each vessel separately, the heat of fermentation is removed through the walls of the vats or the like by means of a gaseous medium advantageously air, the walls of the vats being of metal to facilitate the flow of heat. For this purpose each fermentation vessel, or a group thereof, is provided with a casing which forms between itself and the walls of the vessel a space isolated from the general room atmosphere, thus providing a species of sub-chamber for each vessel or group of vessels, a gaseous medium, advantageously air, being led as the tempering medium through this sub-chamber, while the apparatus for tempering the medium filling the sub-chamber can be outside the latter; in this case the medium is sucked or pressed through the tempering apparatus, so that in most cases compression or suction devices will be needed to set in motion the tempering medium acting on the walls of the vessel. The apparatus for tempering or cooling the medium can however be arranged in the sub-chamber itself, preferably without being in contact with the vessel walls.

By this arrangement the fermentation or storage in each container or the like or each group can be individually carried out, the tempering taking place by the much desired atmospheric cooling.

Further the encasing of the vessels with an air jacket or the like conduces considerably to their lasting qualities; as is well known metal fermentation and storage vessels, in particular of aluminium, are coming more and more into use. If the use of these metal vessels brings a further advantage to the above described process, for naturally metal vessels are particularly adapted for tempering through their walls, it must also be remembered that the above mentioned fermentation difficulties can be ascribed not only to the faults of the tempering methods used hitherto, but are also due in many cases to electrical phenomena.

Such electrical or electrolytic phenomena occur in the fermenting or stored liquids particularly when the electrolyte containing fermenting liquid comes into contact during the fermenting process with two metals, as is the case for example in the usual aluminium vessels which are provided with copper cooling coils; but the connection of the metal fermenting and storing vessels with the earth gives rise to earth leakages so that an effect is set up due to the potential difference between the container and earth. Even if the electrical or electrolytic phenomena during the fermentation are small it must always be remembered that certain quantities of metal go into solution and that the acidity of the liquid varies sometimes zonally, both results acting in an undesirable manner.

According to the invention, with fermentation or storage in metal vessels the occurrence of electrical potential differences is prevented by the liquid in the vessels not coming into contact with more than a single metal, passage of current between the liquid and earth being preferably prevented by electrical insulation of the vessels.

In addition to the advantage that the fermentation takes place without undesirable effects, the electrical insulation of the containers in accordance with the invention also has the advantage that electrolytic damage to the metallic, in particular aluminium, fermenting and storage vessels, hitherto almost unavoidable, is so retarded or hindered that it can be practically ignored. Preferably to avoid the formation of conducting bridges, insulators are used which make the formation of conductive films of moisture practically impossible; plate or bell shaped elements in which portions of large cross-section succeed portions of small cross-section, based upon the experience gained with high tension insulation, may be used.

In the simplest case strips or blocks of insulating material, for example, glass ceramic material, hard rubber or the like, placed between the vessel and earth, provide a solution to the problem, the insulation preferably being built into the supports or feet of the vessel.

The accompanying drawings show by way of example embodiments of apparatus suitable for carrying out the invention.

Figure 1 is a longitudinal section on the line I—I of Figure 2 and Figure 2 a cross-section on the line II—II of Figure 1.

Figure 3 shows a fermenting vat with a cooling apparatus for the tempering medium located outside the sub-chamber, the medium being forced through the sub-chamber.

Figure 4 shows a fermenting vat in longitudinal section, in which the apparatus for cooling the tempering medium is located inside the sub-chamber, and devices provided to prevent earth connection of the metal vat.

Figures 5, 6 and 7 show on an enlarged scale, insulating supports such as are used in the apparatus of Figure 4.

Figures 1 and 2 show a fermenting vat provided with a sub-chamber according to the invention, in which a gaseous medium, here air, after passing through a tempering device (a cooling coil) outside the sub-chamber is sucked through the sub-chamber through a labyrinth like path.

The fermenting vat 1 is provided with a casing 2 for example of compressed concrete, which is externally covered in the usual way with breeze blocks 3, that is porous blocks made from concrete with a coarse aggregate of coke or cinders. The vat 1 rests only with its upper marginal edges on the casing 11 and leaves a free jacket space 13 between itself and the casing. To support the walls and bottom of the vat, supporting ribs 14 of troughing or the like are provided in the space 13. These supporting members which could naturally be of masonry instead, are advantageously arranged labyrinth fashion, as can be seen in Figure 2, so that the flowing tempering medium is compelled to sweep the whole surface of the vat walls and bottom.

The cooling medium, in the simplest case air, enters by the inlet pipe 6, traverses the jacket space 13, reaches the exhauster 9 through the outflow pipe 7 and passes through the pipe 11 into the open air or back to the cooling chamber 4.

The tempering of the air takes place in the chamber 4 which is connected with the open air outside the fermenting room or with the tube 11, through an air passage 5. The air passage can also open wholly or in part into the main room so that the apparatus at the same time serves for ventilating the main room or cellar. Preferably a slat shutter 8 or the like is provided in the passage 5 to enable the quantity of air to be regulated.

Inside the chamber 4 is a known device for cooling air, for example a cooling coil 10 traversed by cold brine or the like.

A cooling chamber 4 and exhauster 9 can serve for common use of a whole series of vessels, in which case the tempering of the individual vessels or vats can be controlled by regulation of the air flowing through the separate chambers 13 by means of suitable regulating members in the inflow or outflow tubes 6, 7.

In Figure 3 the vat 1 is surrounded by a casing which is constructed for example of hollow breeze blocks 15 in such a manner that the hollow spaces 16 form a communicating system surrounding the whole of the walls and bottom of the vat. This jacket itself is preferably enclosed in a cast concrete layer 2 and a breeze cover 3. The chamber 16 is supplied with cooled medium by a pump 17 through the pipe 19. The inlet pipe 19 advantageously passes through a device 21 in which the medium is brought to the required temperature.

In Figure 4 the vat 1 is again surrounded by a casing 2, for example of compressed concrete, covered outside in the usual way with breeze blocks 3. The vat 1 rests with its upper edges only on members 22 of electrical insulating material 22 for example plates of rubber or synthetic resin, embedded in the casing 2, and leaves a free jacket space 13 between itself and the casing. To support the bottom of the vat, insulating supports 18 are provided; similar supports can be used to support the side walls of the vat. The coil 10 is carried in the jacket space 13, a medium, for example cooled brine or the like being supplied through inlet and outlet pipes 20, 21 respectively. The coil 10 is supported at three places by carriers 33, which are advantageously let into the casing 2.

The cooling coil 10 does not make direct contact with the vat walls, but simply cools the gaseous medium filling the jacket space, in the present case air, which in its turn uniformly tempers the vat walls.

The vat 1 is completely insulated electrically by the insulating supports and the members 22 and has no conductive connection with the earth.

An outlet from the jacket space is provided at 34 in order to lead off any water condensed in the jacket. The jacket 13 itself can be made completely airtight with respect to its surroundings.

The arrangement of the cooling coil 10 can be carried out in the jacket space in any desired manner, for example it can run lengthwise below the bottom of the vat.

It should also be pointed out that the fermentation vats can be constructed from the start with hollow walls and bottoms.

The invention is not restricted to open vessels, but also extends to closed fermenting and storage tanks.

It should particularly be mentioned that with the use of fermenting and storage vessels in accordance with the invention, the cooling of the main fermenting or storing room or cellar as a whole no longer needs to be carried out with exactitude, but the tempering can be chiefly restricted to the filled vessels, which leads to considerable economies.

Figure 5 shows a round insulating support which can be used with advantage for supporting strong walled vessels with free supporting bottoms. The bottom 1 of the vessel rests on a strong block 23 of rubber, hard rubber, or the like which is mounted centrally in the summit of a bell 24 of stone ware, porcelain or the like. In the centre of the lower surface of this bell is a bearing bush of oxydation resisting material in which is borne the end 25 of a strong screw spindle 27. At about its centre the spindle 27 has a collar 26 with radial holes so that the spindle can be turned by the aid of a tommy bar. The screwed portion of the spindle 27 meshes in a tapped bush 28 which is non-rotatably mounted in a cylindrical foot 29 of insulating material. The object of the screw and tapped bush between the insulating bodies 24 and 29 is to enable adjustments to be made to allow for unevennesses in the floor below the container and thus relieve the bottom of the vessel from strains.

In a simpler and cheaper form the foot 29 can be as usual of metal, in which is then mounted a tapped bush 28 of insulating material. In this case again, the screwed spindle 27 with the band 26 meshes in the bush 28. The bell 24 is omitted and the end 25 of the spindle is guided by a shoulder or inverted footstep bearing secured to the bottom of the vessel.

Figures 6 and 7 show an insulating rail as is advantageous for supporting a weak bottomed flat or cylindrical fermenting vessel, the respective views being sections on the lines VI—VI and VII—VII.

The bottom 1 of the vessel lies on a prismatic rubber block 23 of suitable length, resting on the summit line of a swallow-tail sectioned bar 30 of insulating material. Between this bar and the floor bar 32 also of insulating material are interposed strong strips 31 of yielding but sufficiently rigid material for example lead, which lie in a longitudinal groove in the top of the floor bar 32. Owing to its adaptability this arrangement makes it possible to support long vessels without straining them.

What I claim is:—

1. Apparatus for use in fermenting and storing liquids, comprising a metal vessel, means for electrically insulating the said vessel from earth, a casing forming a closed jacket space surrounding said vessel and adapted to contain a gaseous tempering medium, and means for bringing said medium to a desired temperature.

2. Apparatus for use in fermenting and storing liquids, comprising a vessel having all parts in contact with the liquid of a single metal, means electrically insulating said vessel from earth, a casing forming a closed jacket space surrounding said vessel adapted to contain a gaseous medium and means for bringing said medium to a desired temperature.

3. Apparatus for use in fermenting and storing liquids comprising an outer casing, a vessel constructed of a single metal supported by electrical insulators from the top of said casing so as to leave a jacket space between them, means for feeding a gaseous tempering medium through said jacket space, means for bringing said medium to a desired temperature, and electrical insulating supports supporting the bottom of said vessel.

4. Apparatus for use in fermenting and storing liquids comprising an outer casing, a vessel constructed of a single metal supported by electrical insulators from the top of said casing so as to leave a jacket space between them, means for feeding a gaseous tempering medium through said jacket space, means for bringing said medium to a desired temperature, and electrical insulating supports adaptable to uneven floor levels supporting the bottom of said vessel.

5. Apparatus for use in fermenting and storing liquids, comprising a vessel having all parts in contact with the liquid of a single metal, means electrically insulating said vessel from earth, and a casing forming a closed jacket space for receiving a tempering medium surrounding said vessel.

RUDOLPH HORCH.